United States Patent
Spengler et al.

(10) Patent No.: US 10,354,141 B2
(45) Date of Patent: Jul. 16, 2019

(54) ROLE-BASED PERCEPTION FILTER

(71) Applicant: MOTOROLA SOLUTIONS, INC., Chicago, IL (US)

(72) Inventors: Charles Spengler, Hoffman Estates, IL (US); Eric Johnson, Chicago, IL (US); Benjamin Zaslow, New York, NY (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 64 days.

(21) Appl. No.: 15/668,599

(22) Filed: Aug. 3, 2017

(65) Prior Publication Data
US 2019/0042849 A1 Feb. 7, 2019

(51) Int. Cl.
*G06K 9/00* (2006.01)
*G06F 17/15* (2006.01)
(Continued)

(52) U.S. Cl.
CPC ......... *G06K 9/00691* (2013.01); *G06F 16/22* (2019.01); *G06F 17/153* (2013.01); *G06K 9/00637* (2013.01); *G06K 9/00671* (2013.01); *G06K 9/4609* (2013.01); *G06F 16/14* (2019.01); *G06F 16/248* (2019.01); *G06F 16/38* (2019.01); *G06K 9/00677* (2013.01); *G06T 7/11* (2017.01)

(58) Field of Classification Search
CPC .......... G06K 9/00691; G06K 9/00637; G06K 9/4609; G06K 9/00677; G06F 17/153; G06F 17/30554; G06T 11/206
USPC ........................................................ 382/224
See application file for complete search history.

(56) References Cited

U.S. PATENT DOCUMENTS 7,970,721 B2 * 6/2011 Leskovec .......... G06F 17/30864
706/46
8,595,161 B2 * 11/2013 Bearman ................ G06Q 10/00
706/17
(Continued)

OTHER PUBLICATIONS

PCT/US2018/043013 International Search Report and Written Opinion of the International Searching Authority dated Oct. 9, 2018 (14 pages).
(Continued)

*Primary Examiner* — Daniel G Mariam
(74) *Attorney, Agent, or Firm* — Michael Best & Friedrich LLP (57) ABSTRACT

Systems and methods for filtering objects of interest associated with an investigation. One method includes receiving a role identifier. The method includes retrieving metadata corresponding to the plurality of objects of interest. The method includes determining, with a classifier, a plurality of relationships between at least two of the objects of interest based on the metadata. The method includes identifying, based on the metadata, a subset of the plurality of relationships that are associated with the role identifier, the subset of the plurality of relationships including a subset of the plurality of objects of interest. The method includes generating a graphical representation including a first indication of the subset of the objects of interest and a second indication of the subset of the plurality of relationships. The method includes presenting the graphical representation on a display communicatively coupled to the electronic processor.

18 Claims, 6 Drawing Sheets

(51) Int. Cl.
*G06K 9/46* (2006.01)
*G06F 16/22* (2019.01)
*G06T 7/11* (2017.01)
*G06F 16/38* (2019.01)
*G06F 16/14* (2019.01)
*G06F 16/248* (2019.01)

(56) References Cited

U.S. PATENT DOCUMENTS

| | | | |
|---|---|---|---|
| 9,619,851 B1 * | 4/2017 | McIntyre | G06Q 50/26 |
| 2012/0084288 A1 * | 4/2012 | Abdul-Razzak | G06Q 50/265 |
| | | | 707/737 |
| 2014/0282219 A1 | 9/2014 | Haddock | |
| 2015/0120744 A1 | 4/2015 | Horn | |

OTHER PUBLICATIONS

Aleman-Meza et al., "Ranking Complex Relationships on the Semantic Web," IEEE Internet Computing, Institute of Electrical and Electronics Engineers, US, vol. 9, No. 3, May 1, 2005 (May 1, 2005) pp. 37-44.

* cited by examiner

ROLE-BASED PERCEPTION FILTER

BACKGROUND OF THE INVENTION

Law enforcement and other government personnel perform investigations in the course of their duties. For example, a police detective may investigate a crime, and a building inspector may inspect a building for compliance with applicable building codes. Some personnel may have specific investigatory roles, each specializing in a particular area of investigation. Personnel performing such investigations collect information on objects of interest associated with the investigation.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted, law enforcement and other government personnel performing investigations gather large amounts of data and documentation pertaining to the investigations. Investigatory personnel also produce reports, and gather or data relating to the investigation from government and other sources. Included in such data and documentation are many objects of interest related to the investigation. An object of interest is anyone or anything identified by an investigator as being involved in or relevant to the investigation of the incident. Objects of interest are sometimes identified in or extracted from still images and video, which may be collected from vehicle-mounted or body-worn cameras or from other sources.

Also included in the collected data and documentation are relationships between one or more of the objects of interest. Relationships between objects of interest may be manually defined (for example, by investigators) or may be derived automatically (for example, using one or more classifiers). The data and documentation may relate to various objects of interest, including people, vehicles, buildings, or portions of buildings, and fixed or movable physical objects involved or potentially involved with the investigation. In some instances, objects of interest are identified in images of incidents related to the investigation (for example, an image of a crime scene). Objects of interest may also include digital representations of intangible data or documents related to the investigation. Relationships between the objects of interest, beyond their shared association with the investigation, may also be useful to investigatory personnel.

Objects are related when they share a common characteristic or property. Objects of interest are also considered related when an investigator indicates that they are. Personnel performing investigations may have different investigatory roles. A single investigation may include hundreds of objects or interest, each potentially having one or more relationships to one or more other of the objects of interest. Analysis of the objects of interest and known and derived relationships may produce an overwhelming amount of data. This may hinder rather than help an investigation. Accordingly, systems and methods are provided herein for, among other things, filtering objects of interest and the relationships between them using a role-based perception filter.

One example embodiment provides a system for filtering objects of interest associated with an investigation. The system includes a database, a display, and an electronic processor communicatively coupled to the database and the display. The electronic processor is configured to receive a role identifier. The electronic processor is configured to retrieve, from the database, metadata corresponding to the plurality of objects of interest. The electronic processor is configured to determine, with a classifier, a plurality of relationships between at least two of the objects of interest based on the metadata. The electronic processor is configured to identify, based on the metadata, a subset of the plurality of relationships that are associated with the role identifier, the subset of the plurality of relationships including a subset of the plurality of objects of interest. The electronic processor is configured to generate a graphical representation including a first indication of the subset of the objects of interest and a second indication of the subset of the plurality of relationships. The electronic processor is configured to present the graphical representation on the display.

Another example embodiment provides a method for filtering objects of interest associated with an investigation. The method includes receiving, with an electronic processor, a role identifier. The method includes retrieving, from a database communicatively coupled to the electronic processor, metadata corresponding to the plurality of objects of interest. The method includes determining, with a classifier, a plurality of relationships between at least two of the objects of interest based on the metadata. The method includes identifying, based on the metadata, a subset of the plurality of relationships that are associated with the role identifier, the subset of the plurality of relationships including a subset of the plurality of objects of interest. The method includes generating a graphical representation including a first indication of the subset of the objects of interest and a second indication of the subset of the plurality of relationships. The method includes presenting the graphical representation on a display communicatively coupled to the electronic processor.

Another example embodiment provides a method for filtering a plurality of objects of interest. The method includes receiving, with an electronic processor, a plurality of object identifiers, each of the object identifiers corresponding to one of the plurality of objects of interest associated with an image of the incident scene. The method includes receiving metadata for the plurality of object identifiers. The method includes determining, with the electronic processor, a plurality of relationships based on the metadata, where each of the plurality of relationships corresponds to at least two of the plurality of objects of interest. The method includes generating a graphical representation based on the plurality of objects of interest and the plurality of relationships. The graphical representation includes a plurality of nodes, each node providing an indication of one of the plurality of objects of interest. The graphical representation also includes a plurality of edges, each edge connecting two of the plurality of nodes and providing an indication of one of the plurality of relationships. The method includes receiving a role identifier. The method includes, in response to receiving the role identifier, applying a role-based perception filter corresponding to the role identifier to the plurality of objects of interest and the plurality of relationships to generate a filtered graphical representation. The method includes presenting the filtered graphical representation on a display.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

Figure 1:
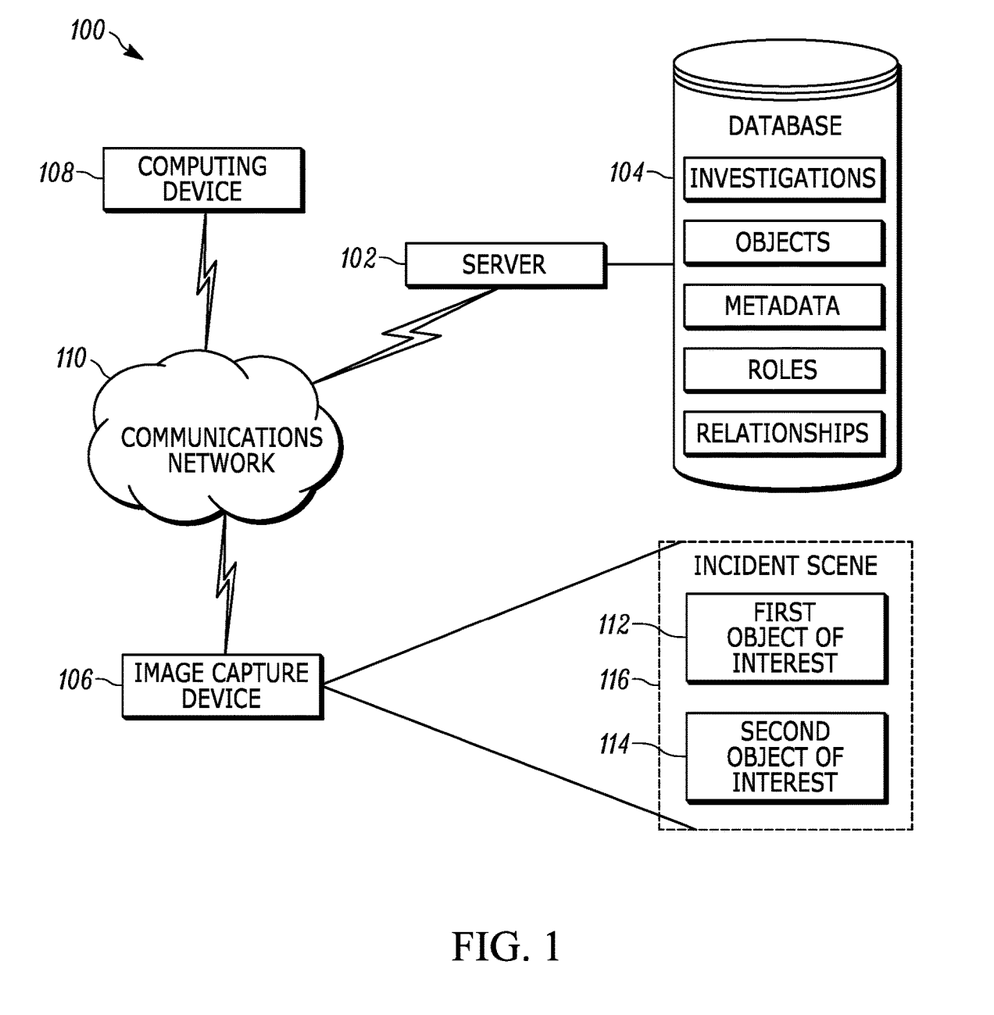
FIG. 1 is a diagram of a system for filtering objects of interest in accordance with some embodiments.
Figure 2:
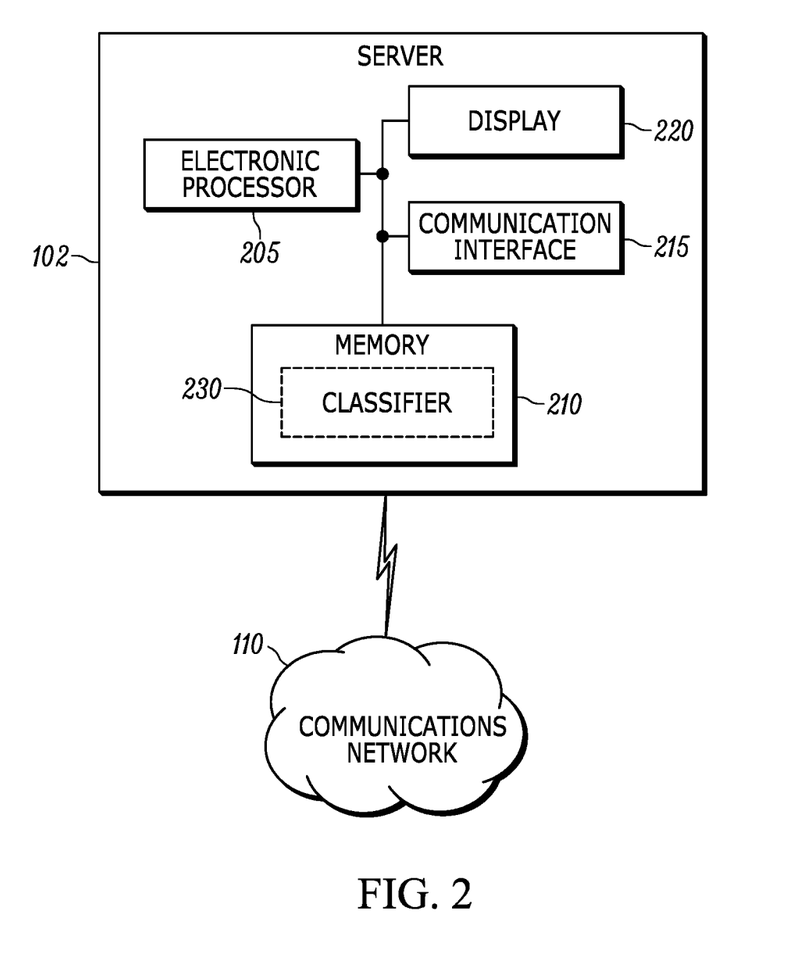
FIG. 2 is a diagram of a server of the system of FIG. 1 in accordance with some embodiments.

FIG. 1 illustrates an example system 100 for filtering objects of interest. In the example illustrated, the system 100 includes a server 102 and a database 104. The server 102, described more particularly below with respect to FIG. 2, is communicatively coupled to, and writes data to and from, the database 104. As illustrated in FIG. 1, the database 104 may be a database housed on a suitable database server communicatively coupled to and accessible by the server 102. In alternative embodiments, the database 104 may be part of a cloud-based database system external to the system 100 and accessible by the server 102 over one or more additional networks. In some embodiments, all or part of the database 104 may be locally stored on the server 102. In some embodiments, as described below, the database 104 electronically stores data on investigations, objects of interest (for example, a first object of interest 112 and a second object of interest 114), metadata (for example, related to the objects of interest), investigatory roles, and relationships (for example, between the objects of interest). In some embodiments, the server 102 and the database 104 are part of a computer-aided dispatch system.

The server 102 is communicatively coupled to an image capture device 106 and a computing device 108 via a communications network 110. The communications network 110 is a communications network including wireless and wired connections. The communications network 110 may be implemented using a local area network, such as a Bluetooth™ network or Wi-Fi, a wide area network, such as the Internet, and other networks or combinations of networks including a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, and a 4G network. Derivatives of such networks and other suitable networks, including future-developed networks may also be used.

The image capture device 106 is an electronic device that captures, for example, still images, video, or both of the first object of interest 112, the second object of interest 114, or other objects of interest (not shown) in the incident scene 116. As used herein, the term "image" encompasses both still images and video. In some embodiments, the image capture device 106 is a body-worn camera. In other embodiments, the image capture device may be or include a smart telephone, a vehicle dash camera, a surveillance camera, a traffic camera, or another suitable image capture device that records video or still images or objects of interest. In some embodiments, the image capture device 106 transmits, via the communications network 110, the captured images and video streams to the server 102, which extracts objects of interest from them. In some embodiments, the image capture device 106 extracts the objects of interest from the captured images and transmits the objects to the server 102. In some embodiments, the server 102 and the image capture device 106 include software and hardware to electronically detect and classify objects within captured images and video streams (for example, video processors and object classifier algorithms). Object classification is known in the art, and will not be described in detail herein.

The server 102 may also receive objects of interest, and other data as described below, from a computing device 108. In some embodiments, the computing device 108 is a computer terminal, for example, at a Command Center. In other embodiments, the computing device 108 is a suitable electronic device for sending and receiving data to and from the server 102 (via the communications network 110), for example, a smart telephone, a tablet computer, a laptop computer, a smart watch, and the like.

FIG. 2 illustrates an example of the server 102. In the embodiment illustrated, the server 102 includes an electronic processor 205, a memory 210, a communication interface 215, and a display 220. The illustrated components, along with other various modules and components are coupled to each other by or through one or more control or data buses that enable communication therebetween.

The electronic processor 205 obtains and provides information (for example, from the memory 210 and/or the communication interface 215), and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein.

The memory 210 can include one or more non-transitory computer-readable media, and includes a program storage area and a data storage area. The program storage area and the data storage area can include combinations of different types of memory, as described herein. In the embodiment illustrated, the memory 210 stores, among other things, a classifier 230. In some embodiments, the memory 210 stores and the electronic processor 205 executes multiple classifiers. In some embodiments, the classifier is a machine learning algorithm (for example, a neural network or Bayes classifier).

The communication interface 215 may include a wireless transmitter or transceiver for wirelessly communicating over the communications network 110. Alternatively or in addition to a wireless transmitter or transceiver, the communication interface 215 may include a port for receiving a cable, such as an Ethernet cable, for communicating over the communications network 110 or a dedicated wired connection. It should be understood that, in some embodiments, the server 102 communicates with the image capture device 106, the computing device 108, or both through one or more intermediary devices, such as routers, gateways, relays, and the like.

The display 220 is a suitable display such as, for example, a liquid crystal display (LCD) touch screen, or an organic light-emitting diode (OLED) touch screen. In some embodiments, the display is integrated with the server 102. The server 102 implements a graphical user interface (GUI) (for example, generated by the electronic processor 205, from instructions and data stored in the memory 210, and presented on the display 220), that enables a user to interact with the server 102. In some embodiments, the server 102 operates or is integrated with a head-mounted display (HMD), an optical head-mounted display (OHMD), or the display of a pair of smart glasses. In some embodiments, a user interacts with the server 102 remotely using a remote electronic device (for example, the computing device 108).

In some embodiments, the server 102 operates using, among other things, augmented reality technology, where live images are displayed (for example, on the display 220) with text, graphics, or graphical user interface elements superimposed on or otherwise combined with the live images. In some embodiments, the server 102 operates using, among other things, virtual reality technology, where actual or simulated images are displayed (for example, on the display 220) with text, graphics, or graphical user interface elements superimposed on or otherwise combined with the images.

In some embodiments, the electronic processor 205 performs machine learning functions. Machine learning generally refers to the ability of a computer program to learn without being explicitly programmed. In some embodiments, a computer program (for example, a learning engine) is configured to construct an algorithm based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using one or more of these approaches, a computer program can ingest, parse, and understand data and progressively refine algorithms for data analytics.

As noted above, the server 102 receives objects of interest and other data (for example, from the database 104, the image capture device 106, and the computing device 108). As described in detail below, the electronic processor 205 is configured to analyze and filter the objects of interest to enhance investigations. As used herein, the term "investigation" may refer to one or more related investigative efforts. For example, an investigation may be the investigation of an incident (for example, a crime). In another example, an investigation includes the surveillance or patrol duties performed by a police officer. In another example, an investigation is the response to a call for service, for example, responding to a crime, responding to a traffic accident, searching for a suspect, locating a missing person, responding to a fire, responding to a medical emergency, and the like. In yet another example, an investigation is an inspection of a building or other location for compliance with applicable codes and regulations. An investigation may include multiple related incidents or responses. For example, an investigation of a crime may include the initial investigation of the crime scene, as well as subsequent suspect and witness interviews. In another example, an investigation includes the investigations of multiple crime or potential crime scenes, or other areas of interest.

Performing an investigation includes the detection, categorization, and analysis of objects of interest. Some personnel performing investigations may have specific investigatory roles. An investigatory role implies a specialized knowledge in a particular area of investigation, for example, homicide, burglary, drugs, explosives, human trafficking, domestic violence, code enforcement, and the like. As described below, investigatory roles may be used to characterize objects of interest and relationships between objects of interest.

An object of interest (for example, a first object of interest 112 and a second object of interest 114) is anyone or anything identified by an investigator as being involved in or relevant to an investigation. Objects of interest may also be identified automatically, for example, through the use of a classifier. Objects of interest may include, for example, people (for example, victims or suspects), automobiles, weapons, buildings, or portions of buildings. Objects of interest may also be tangible things not commonly thought of as objects, but which are still relevant to the investigation, for example, fluids leaked from automobiles, debris from damaged property, and blood. An object of interest may also be a physical property or characteristic of another object (for example, a dent in an automobile, a graffiti tag on a building, or an article of clothing on a person). Objects of interest also include digital representations of data or documents related to the investigation, for example, police reports, search warrants, records of transactions, government documents, scanned papers, records of objects seized during a search, sounds, detectable smells (for example, of drugs, chemicals, or explosives), and the like.

As noted above, one or more objects of interest may share one or more relationships with one another. Objects are related when they share a common characteristic. For example, a wheel may be related to a nearby vehicle, a group of persons may be related by their association with a criminal enterprise, and an article of clothing may be related to the wearer. In another example, a group of objects that could be used to make an explosive device are related to one another. In yet another example, the components needed to make an illicit drug are related to one another.

Whether or what sort of relationship exists between objects of interest may change with investigatory roles. One set of objects of interest may be related one way in light of one investigatory role, but may be related in another way, or viewed as unrelated, in light of another investigatory role. For example, a collection of household chemicals may be related to drug production when viewed by a drug investigator, while the same chemicals may be related to poisoning when viewed by a homicide investigator, and still other investigators may see no relationships at all between the chemicals.

Figure 3:
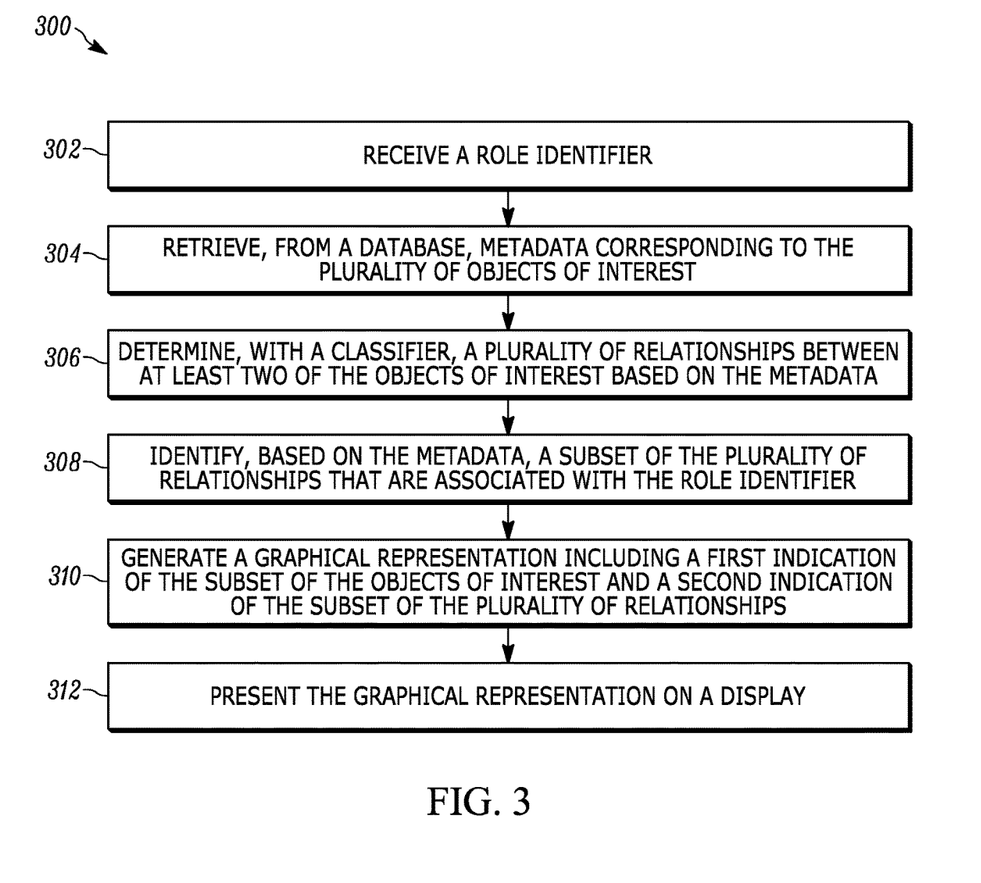
FIG. 3 is a flowchart of a method for filtering objects of interest in accordance with some embodiments.

Some investigations involve a large amount of objects of interest and potential relationships. Graphically presenting all of the objects of interest and relationships to an investigator results in a large, complex display, which may be visually confusing and difficult to navigate. Because some of the objects of interest and relationships may be relevant to some investigatory roles, but not to others, methods are provided herein to filter the objects of interest and relationships using role-based perception filters. For example, FIG. 3 illustrates an example method 300 for filtering a plurality of objects of interest associated with an investigation. The method 300 is described as being performed by the server 102 and, in particular, the electronic processor 205. However, it should be understood that in some embodiments, portions of the method 300 may be performed external to the server 102 by other devices, including for example, the image capture device 106 and the computing device 108.

As an example, the method 300 is described in terms of the server 102 filtering a predetermined plurality of objects of interest. In some embodiments, the plurality of objects of interest may be retrieved from the database 104. In some embodiments, some of the plurality of objects of interest may be received from the image capture device 106, the computing device 108, another source external to the server 102, or some combination of the foregoing. Regardless of the source, each of the plurality of objects is associated with an investigation, for example, the investigation of a crime scene.

At block 302, the electronic processor 205 receives a role identifier. The role identifier corresponds to an investigatory role. In some embodiments, the electronic processor 205 receives the role identifier from a user operating the server 102 (for example, from a user profile). In some embodiments, the role identifier is specified by a user, but may not correspond to the user. In some embodiments, electronic processor 205 retrieves the role identifier from the database 104, for example, based on an investigator assigned to an investigation. In some embodiments, the electronic processor 205 receives multiple role identifiers. For example, a user of the server 102 may have an assigned role identifier, and the same user may specify one or more additional role identifiers.

In some embodiments, the role identifier and corresponding investigatory roles are stored in the database 104. In one example, each investigatory role has a record or records in the database identified by the role identifier. Each record includes information regarding the identified investigatory role, for example, what types of objects of interest may be relevant to the role, one or more potential relationships between types of objects of interest that are relevant to the role, groups of related objects of interest relevant to the role, and the like.

At block 304, the electronic processor 205 retrieves, from the database, metadata corresponding to the plurality of objects of interest. Metadata is data relating to or describing the objects of interest. In some embodiments, metadata includes a timestamp for object of interest identifying, for example, when the object was first discovered by investigators, when the object was cataloged, and the like. In some embodiments, metadata includes a location for the object identifying, for example, where the object was located when it was first discovered by investigators, the current location of the object, and the like. In some embodiments, metadata includes an image of the object, for example, extracted from an image captured by the image capture device 106. In some embodiments, metadata includes an object identifier, for example, a globally-unique identifier used to identify the object within the database 104. In some embodiments, metadata includes an investigation identifier, for example, a unique identifier associating the object with an investigation. In some embodiments, the unique identifier is linked to a record in a computer-aided dispatch system, a records management system, or a content management system (for example, the CommandCentral Vault™ by Motorola Solutions®). In some embodiments, metadata includes an object type that characterizes the object (for example, person, automobile, weapon, document, and the like). In some embodiments, metadata includes an incident type, for example, an indicator of the type of incident with which the object is associated (for example, a crime, a missing person, a traffic accident, and the like). In some embodiments, metadata includes a role identifier, as described above. In some embodiments, metadata includes a potential or actual relationship to another object of interest, for example, an automobile may be related to a registered owner record, or a weapon may be related to a body.

The foregoing examples should not be considered limiting. Metadata corresponding to an object of interest is any data relating to or describing the object of interest or the object's relationship to other objects of interest, or any aspect of the object of interest that may be relevant to the investigation. Metadata may be entered by investigators collecting information, for example, via a police or inspection report. Metadata may also be collected automatically. In some embodiments, the electronic processor 205 retrieves metadata related to objects of interest from various government and public databases. For example, an identification number for a vehicle may be used to retrieve ownership information for the vehicle. In another example, financial information for a suspect may be used to retrieve data on recent transactions by that suspect from financial institution databases.

At block 306, the electronic processor 205 determines, with a classifier (for example, the classifier 230), a plurality of relationships between at least two of the objects of interest based on the metadata. The classifier 230 automatically identifies relationships between the objects of interest based on, for example, historical determinations of relationships, defined relationships entered by users of the system, and matches between the metadata for the objects of interest. For example, the electronic processor 205 may determine a relationship between two objects of interest when there is a property or characteristic common to both objects of interest. In some embodiments, the electronic processor 205 retrieves one or more relationships the database 104 or from user inputs. In some embodiments, the electronic processor 205 determines a potential relationship between two objects, which may be verified, for example, by a user of the server 102. In some embodiments, the electronic processor 205 utilizes more than one classifier to automatically identify relationships between the objects of interest. Each classifier is associated with a role, and each role may be associated with multiple classifiers. In some embodiments, the classifier(s) insert a role identifier into the relationships' metadata, when the individual role-based classifiers create the relationships.

At block 308, the electronic processor 205 identifies, based on the metadata, a subset of the plurality of relationships that are associated with the role identifier. Each of the relationships in the subset are associated with a common role identifier, indicating, for example, that the relationship was created by a classifier associated with that role. For example, the electronic processor 205 may identify a subset of the plurality of relationships that are all related to homicide investigations. In another example, the electronic processor 205 may identify a subset of the plurality of relationships that are all related to drug investigations. When more than one role identifier is specified (at block 302), a subset is identified for each role identifier.

Relationships between objects of interest may be identified with more than one investigatory role. For example, a relationship between a bloodstain and a weapon may be of interest to a homicide investigator and a domestic violence expert. In another example, certain flammable liquids may be of interest to an arson investigator, because the liquids can be used to set fires, and to a drug enforcement agent, because they may be used in the manufacture of certain illegal drugs. In some cases, a relationship between objects of interest may be more relevant to one role than another. For example, during a drug trafficking investigation, the aforementioned flammable liquids may be more relevant to the drug enforcement agent role than the arson investigator role. Accordingly, in some embodiments, the electronic processor 205 assigns to each of the plurality of relationships a relationship relevancy score based on the metadata for the objects of interest related by the relationship and the role identifier for the relationship. The relationship relevancy score is a measure (for example, a percentage) indicating the degree to which the relationship is relevant to a particular investigatory role. Metadata that tends to make the relationship more relevant to an investigatory role will increase the relationship relevancy score, whereas metadata that tends to make the object of interest less relevant to an investigatory role will decrease the relationship relevancy score. The relationship relevancy score may also be affected by how strongly the objects are related, as determined by the classifier. In such embodiments, the electronic processor 205 identifies the subset of the plurality of relationships based on the relationship relevancy score. In some embodiments, the electronic processor 205 determines whether a relationship is included in the subset by comparing the relationship relevancy score to a threshold. In one example, the threshold is an absolute threshold (for example, an object relevancy score of at least 0.6 when the possible range is 0 to 1). In another example, the threshold is a relative value indicative of how much higher one relationship relevancy score is from the next nearest relationship relevancy score for the same role, or above a median or average relationship relevancy score for relationships having relationship relevancy scores for the same role.

Optionally, in some embodiments, the electronic processor 205 assigns a weight to one or more of the relationship relevancy scores. The weight is used to indicate how significant a particular relationship relevancy score is to identifying a relationship with an investigatory role relative to other relationships. In some embodiments, the electronic processor 205 assigns a weight based on the metadata for the related objects of interest. In some embodiments, the electronic processor 205 may determine the weights using a machine learning algorithm (for example, a neural network or Bayes classifier). Regardless of how the weight is determined, the electronic processor 205 assigns, for each of the relationships, a weight to the relationship relevancy score to generate a weighted relationship relevancy score. In such embodiments, the electronic processor 205 identifies the subset of the plurality of relationships based on the weighted relationship relevancy score.

The subset of relationships includes a subset of the plurality of objects of interest. The subset of the plurality of objects of interest includes those objects that are related by the relationships generated by the classifier(s) that are associated with the role identifier used to determine the subset or relationships.

In some embodiments, the subsets of relationships are identified using a role-based perception filter associated with the role identifier. Each investigatory role has a corresponding role-based perception filter (for example, stored in the database 104). A role-based perception filter stores information used to determine when an object of interest or a relationship is relevant to its role. For example, a role-based perception filter may include examples of metadata and metadata values that, when present for objects in relationship, make that relationship relevant to the role. A role-based perception filter may also include historical information indicative of what relationships have been selected or determined in the past as relevant to its role. Role-based perception filters may also store relevancy threshold information. Role-based perception filters may be created and updated manually or by using machine learning algorithms.

During some investigations, it may not be readily apparent what investigatory roles should participate in the investigation. For example, there may be objects of interest and relationships that are relevant to a human trafficking expert, but that may escape the notice of other types of investigators. Accordingly, in some embodiments, the electronic processor 205 assigns relationship relevancy scores to the relationships for each of a plurality of investigatory roles. When relevancy scores have been assigned, the electronic processor 205 generates a role-based relationship alert for each of the plurality of relationships when the relationship relevancy score for the relationship exceeds the relevancy threshold. In this way, users of the server 102 are alerted that a particular investigatory role should be involved in the investigation.

Figure 4:
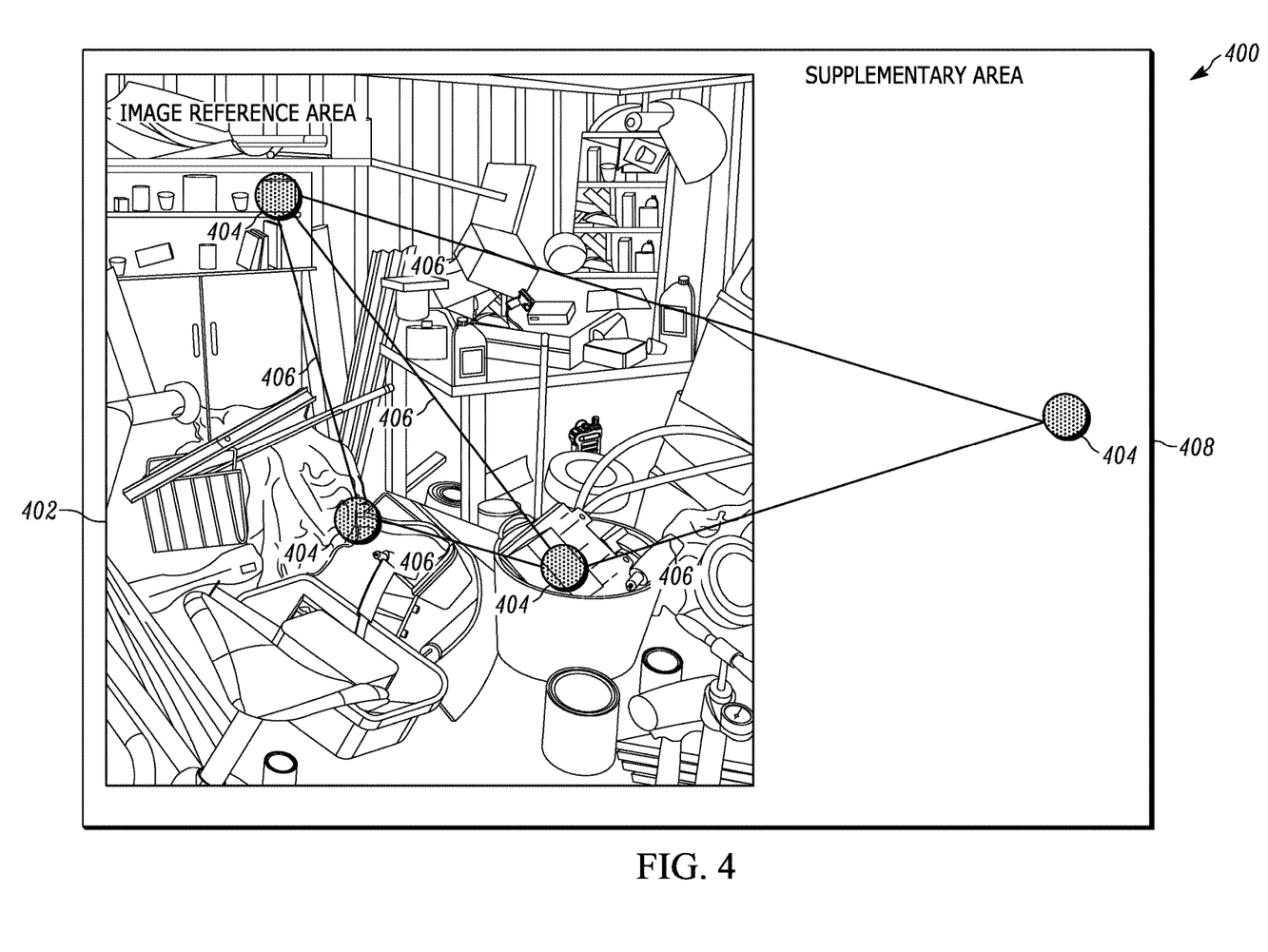
FIG. 4 is an example image produced by the system of FIG. 1 in accordance with some embodiments.

At block 310, the electronic processor 205 generates a graphical representation including a first indication of the subset of the objects of interest and a second indication of the subset of the plurality of relationships. For example, as illustrated in FIG. 4, the graphical representation 400 is a graph that includes a first indication of the subset of the objects of interest, represented by the circles 404, and a second indication of the subset of the plurality of relationships, represented by the lines 406. In some embodiments, the electronic processor 205 generates the graphical representation using information mapping techniques. For example, the graphical representation may be a concept map, a knowledge map, a topic map, a link analysis graph, or the like. The graphical representation may also be, for example, a force-directed graph. In some embodiments, the electronic processor 205 generates the graphical representation by superimposing the first indication on images of its associated objects of interest within an image related to the investigation. For example, as shown in FIG. 4, some of the circles 404 are superimposed on an image 402 from the investigation. In the embodiment illustrated, the graphical representation 400 also includes a supplementary area 408. The supplementary area 408 is used to portray objects of interest that may not be tangible (for example, data relating to the investigation), or that may not have a corresponding image within the image related to the investigation.

At block 312, the electronic processor 205 presents the graphical representation on the display 220. In some embodiments, the electronic processor 205 transmits the graphical representation to a remote device (for example, the computing device 108) for display.

In some cases, embodiments of the system 100 and the method 300 may be used to identify missing objects of interest. For example, four out of five ingredients needed to make an illicit drug may be recovered during an investigation. Identifying the missing ingredient can notify investigators what to look for during subsequent investigation. Accordingly, in some embodiments, the electronic processor 205 may identify a second subset of the plurality of objects of interest. For example, metadata for the second subset of objects may indicate that they are ingredients used to make a particular illicit drug. In some embodiments, the electronic processor 205 compares the second subset to predetermined combinations of objects, each combination representing the ingredient set for a different illicit drug. When the second subset partially matches a predetermined combination, the electronic processor 205 can determine, based on the partial match, the missing ingredient or ingredients. In such embodiments, the graphical representation includes a third indication of the missing object of interest and a fourth indication of a relationship between the missing object of interest and at least one of the objects of interest in the second subset. In some embodiments, the third and fourth indications are highlighted (for example, by using a different color) to indicate that missing objects, which may be relevant to the investigation, have been identified.

As a user of the server 102 operates the system, he or she provides user inputs. For example, the user may identify one or more relationships as relevant to a particular investigatory role. In another example, the user interacts with the graphical representation, adding objects or relationships, selecting existing objects and relationships, adding or changing metadata, and the like. In some embodiments, the electronic processor 205 determines a user investigatory role for the user, for example, by retrieving a user profile for the user. In some embodiments, the user identifies his or her investigatory role to the server 102 via a graphical user interface. In some embodiments, the electronic processor 205 receives the user inputs and updates the role-based perception filter corresponding to the user role for the user based on the user input. In some embodiments, one or more classifiers associated with the role of the user are updated based on the actions and inputs of the user.

Figure 5:
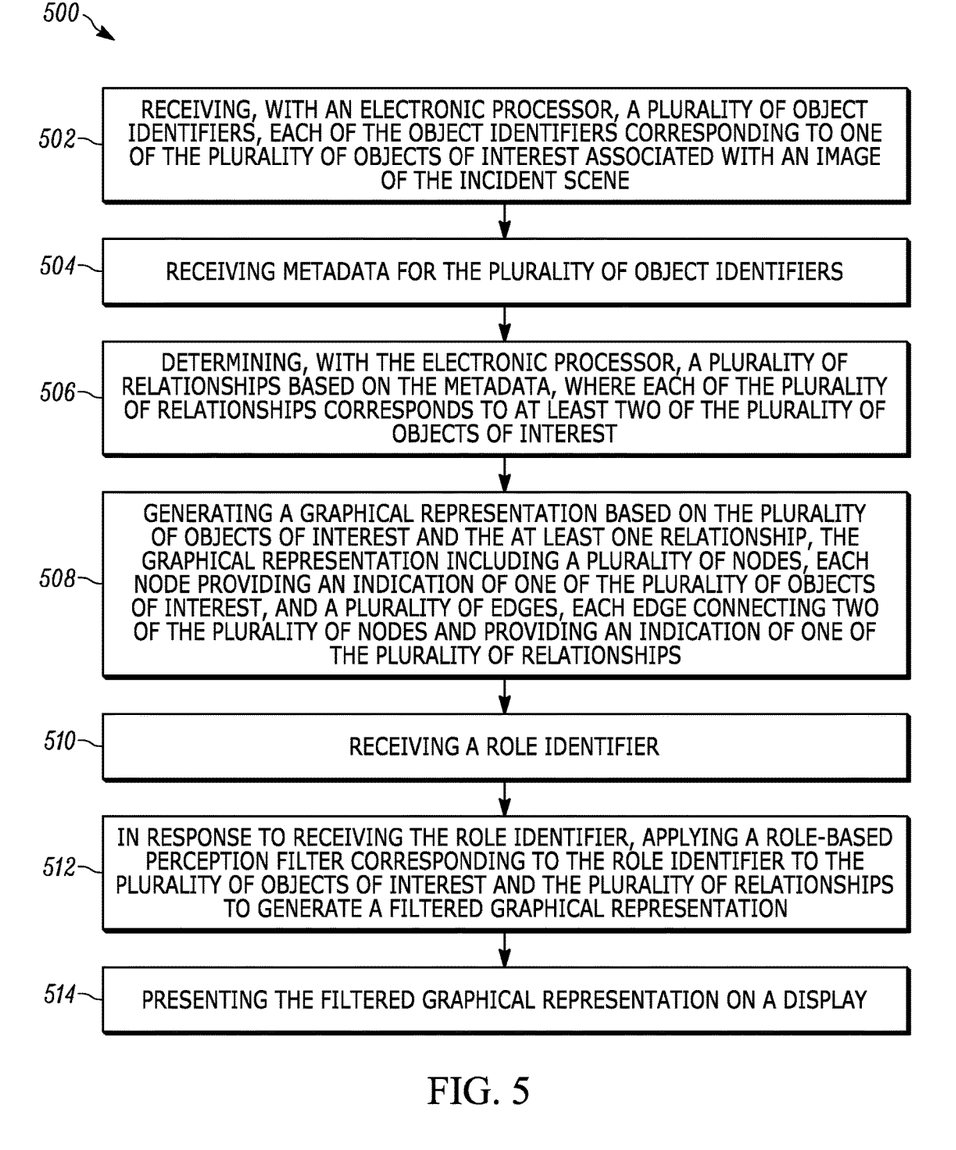
FIG. 5 is a flowchart of a method for filtering a plurality of objects of interest associated with an incident scene in accordance with some embodiments.

FIG. 5 illustrates an example method 500 for filtering a plurality of objects of interest associated with an incident scene. The method 500 is described as being performed by the server 102 and, in particular, the electronic processor 205. However, it should be understood that in some embodiments, portions of the method 500 may be performed external to the server 102 by other devices, including for example, the image capture device 106 and the computing device 108.

At block 502, the electronic processor 205 receives a plurality of object identifiers. Each of the object identifiers corresponds to one of the plurality of objects of interest associated with the image of the incident scene.

At block 504, the electronic processor 205 receives metadata for the plurality of object identifiers. At block 506, the electronic processor 205 determines a plurality of relationships based on the metadata, where each of the plurality of relationships corresponds to at least two of the plurality of objects of interest. Determining relationships is described above with respect to the method 300.

Figure 6:
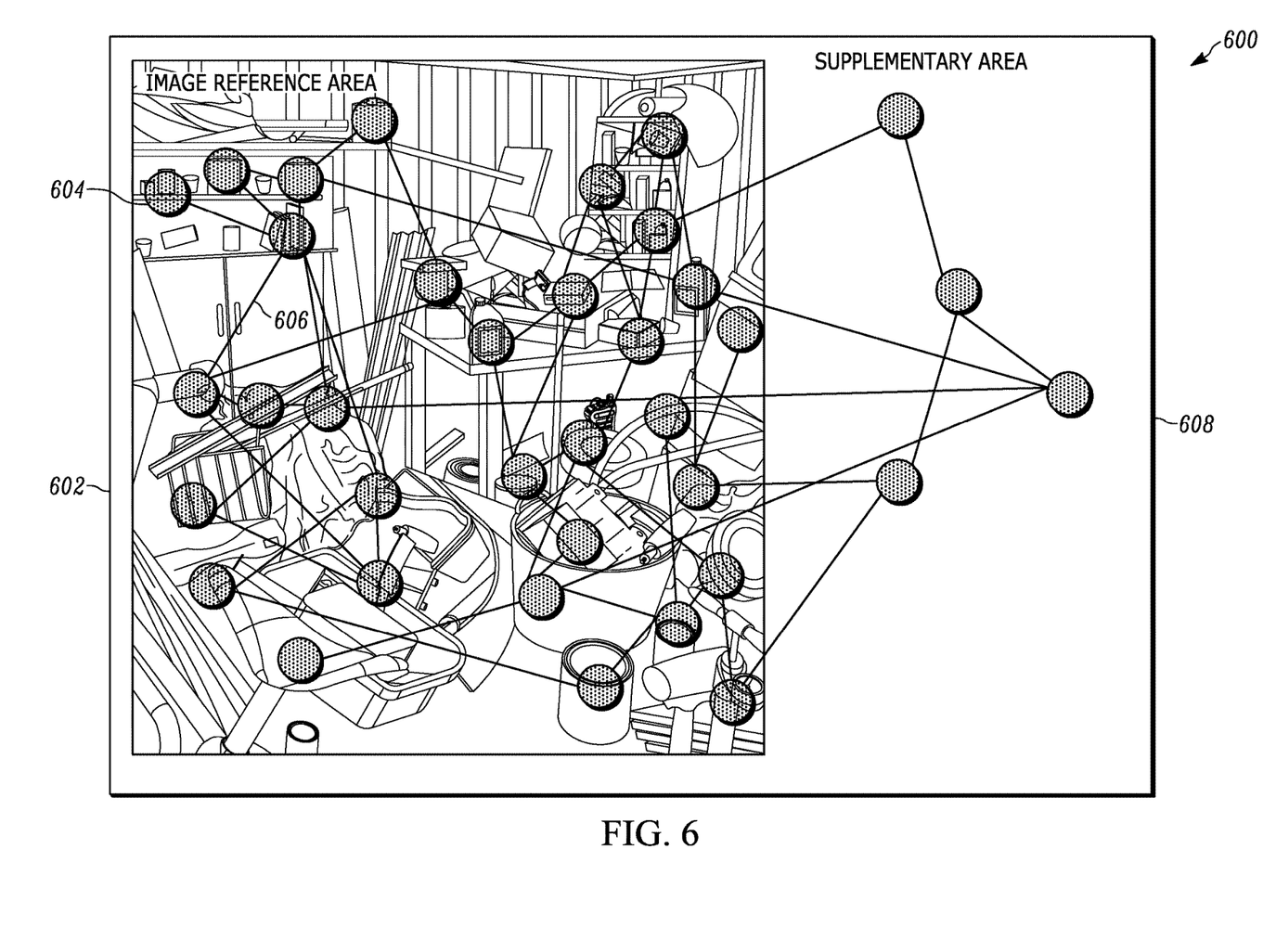
FIG. 6 is an example image produced by the system of FIG. 1 in accordance with some embodiments.

At block 508, the electronic processor 205 generates a graphical representation based on the plurality of objects of interest and the plurality of relationships. FIG. 6 illustrates an example graphical representation 600 including an image 602 of the incident scene. The graphical representation 600 includes a plurality of nodes (represented by circles, for example, node 604). Each node providing an indication of one of the plurality of objects of interest. The graphical representation 600 also includes a plurality of edges (represented by lines, for example, edge 606). Each edge connects two of the plurality of nodes and provides an indication of one of the plurality of relationships. In the example illustrated, the nodes are superimposed on the image on or near the images of the objects of interest that they represent in the image 602 of the incident scene. As with the graphical representation 400 in FIG. 4, the graphical representation 600 includes a supplementary area 608, where intangible objects of interest or objects of interest lacking images in the image 602 can be represented.

Returning to FIG. 5, at block 510, the electronic processor 205 receives a role identifier. As described above with respect to the method 300, the role identifier identifies an investigatory role. In some embodiments, more than one role identifier is received.

As shown FIG. 6, a large quantity of nodes and edges can make it difficult to discern information from the graphical representation 600. Accordingly, at block 512, in response to receiving the role identifier, the electronic processor 205 applies a role-based perception filter corresponding to the role identifier to the plurality of relationships (and, thus, the plurality of objects) to generate a filtered graphical representation. The electronic processor 205 uses the role-based perception filter, described above, to filter out relationships relevant to the role corresponding to the role-based perception filter. In one example, illustrated in FIG. 4, the nodes and edges that do not correspond to the role are removed from the graphical representation 600 to produce the filtered graphical representation 400. In some embodiments, the nodes and edges corresponding to the role are highlighted, for example, using a different color.

At block 514, the electronic processor 205 presents the filtered graphical representation on a display (for example, the display 220).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system for filtering a plurality of objects of interest associated with an investigation, the system comprising:
   a database,
   a display,
   an electronic processor communicatively coupled to the database and the display, and configured to
   receive a role identifier corresponding to an investigatory role associated with the investigation;
   retrieve, from the database, metadata corresponding to the plurality of objects of interest;
   determine, with a classifier, a plurality of relationships between at least two of the objects of interest based on the metadata;
   identify, based on the metadata, a subset of the plurality of relationships that are associated with the role identifier, the subset of the plurality of relationships including a subset of the plurality of objects of interest;
   generate a graphical representation including a first indication of the subset of the objects of interest and a second indication of the subset of the plurality of relationships; and
   present the graphical representation on the display.

2. The system of claim 1, wherein the metadata includes at least one selected from the group consisting of a time-stamp, a location, an image of the object, an object identifier, an investigation identifier, an incident type, a potential relationship to another object of interest, and an object type.

3. The system of claim 1, wherein the electronic processor is further configured to
   assign to each of the plurality of relationships a relationship relevancy score based on the metadata for the objects of interest related by the relationship; and
   identify the subset of the relationships based further on the relationship relevancy score.

4. The system of claim 3, wherein the electronic processor is further configured to, for each of the plurality of relationships, assign a weight to the relationship relevancy score to generate a weighted relationship relevancy score.

5. The system of claim 1, wherein the electronic processor is further configured to
   for each of a plurality of role identifiers
   assign to each of the plurality of relationships a relationship relevancy score based on the role identifier and the metadata for the objects of interest related by the relationship; and
   for each of the plurality of relationships, generate a relationship alert when the relationship relevancy score for the relationship exceeds a relevancy threshold.

6. The system of claim 1, wherein the electronic processor is further configured to
   determine at least one missing object of interest when a second subset of the plurality of objects of interest partially matches a predetermined combination of objects related to the second subset,
   wherein the graphical representation includes a third indication of the missing object of interest and a fourth indication of a relationship between the missing object of interest and at least one of the objects of interest in the second subset.

7. The system of claim 1, wherein the electronic processor is further configured to generate a graphical representation by superimposing the first indication on images of its associated objects of interest within an image related to the investigation.

8. The system of claim 1, wherein the electronic processor is further configured to
determine a user investigatory role for a user;
receive a user input from the user corresponding to an interaction with the graphical representation; and
update a role-based perception filter corresponding to the user investigatory role based on the user input.

9. The system of claim 1, wherein the graphical representation is one selected from the group consisting of a force-directed graph and a link analysis graph.

10. A method for filtering a plurality of objects of interest associated with an investigation, the method comprising:
receiving, with an electronic processor, a role identifier corresponding to an investigatory role associated with the investigation;
retrieving, from a database communicatively coupled to the electronic processor, metadata corresponding to the plurality of objects of interest;
determining, with a classifier, a plurality of relationships between at least two of the objects of interest based on the metadata;
identifying, based on the metadata, a subset of the plurality of relationships that are associated with the role identifier, the subset of the plurality of relationships including a subset of the plurality of objects of interest;
generating a graphical representation including a first indication of the subset of the objects of interest and a second indication of the subset of the plurality of relationships; and
presenting the graphical representation on a display communicatively coupled to the electronic processor.

11. The method of claim 10, wherein retrieving metadata includes retrieving at least one selected from the group consisting of a timestamp, a location, an image of the object, an object identifier, an investigation identifier, an incident type, a role identifier, a potential relationship to another object of interest, and an object type.

12. The method of claim 10, further comprising:
assigning to each of the plurality of relationships a relationship relevancy score based on the metadata for the objects of interest related by the relationship; and
identifying the subset of the plurality of relationships based further on the relationship relevancy score.

13. The method of claim 12, further comprising:
for each of the plurality of relationships, assigning a weight to the relationship relevancy score to generate a weighted relationship relevancy score.

14. The method of claim 10, further comprising:
for each of a plurality of role identifiers
assigning to each of the plurality of relationships a relationship relevancy score based on the role identifier and the metadata; and
for each of the plurality of relationships, generating a relationship alert when the relationship relevancy score for the relationship exceeds a relevancy threshold.

15. The method of claim 10, further comprising:
determining at least one missing object of interest when a second subset of the plurality of objects of interest partially matches a predetermined combination of objects related to the second subset,
wherein generating the graphical representation includes generating a third indication of the missing object of interest and a fourth indication of a relationship between the missing object of interest and at least one of the objects of interest in the second subset.

16. The method of claim 10, further comprising:
determining a user investigatory role for a user;
receiving a user input from the user corresponding to an interaction with the graphical representation; and
updating a role-based perception filter corresponding to the user investigatory role based on the user input.

17. The method of claim 10, wherein generating the graphical representation includes generating one selected from the group consisting of a force-directed graph and a link analysis graph.

18. A method for filtering a plurality of objects of interest, the method comprising:
receiving, with an electronic processor, a plurality of object identifiers, each of the object identifiers corresponding to one of the plurality of objects of interest associated with an image of an incident scene;
receiving metadata for the plurality of object identifiers;
determining, with the electronic processor, a plurality of relationships based on the metadata, where each of the plurality of relationships corresponds to at least two of the plurality of objects of interest;
generating a graphical representation based on the plurality of objects of interest and the plurality of relationships, the graphical representation including
a plurality of nodes, each node providing an indication of one of the plurality of objects of interest, and
a plurality of edges, each edge connecting two of the plurality of nodes and providing an indication of one of the plurality of relationships;
receiving a role identifier corresponding to an investigatory role associated with an investigation;
in response to receiving the role identifier, applying a role-based perception filter corresponding to the role identifier to the plurality of objects of interest and the plurality of relationships to generate a filtered graphical representation; and
presenting the filtered graphical representation on a display.

* * * * *

UNITED STATES PATENT AND TRADEMARK OFFICE
CERTIFICATE OF CORRECTION

PATENT NO. : 10,354,141 B2
APPLICATION NO. : 15/668599
DATED : July 16, 2019
INVENTOR(S) : Spengler et al.

Page 1 of 1

It is certified that error appears in the above-identified patent and that said Letters Patent is hereby corrected as shown below:

In the Claims

At Column 15, Line 39 in Claim 11:
"a role identifier" should read --a role identifier for the object--

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*